United States Patent Office 3,194,783
Patented July 13, 1965

3,194,783
SILICA-RESIN DIRECT FILLING MATERIAL
AND METHOD OF PREPARATION
Rafael L. Bowen, Washington, D.C., assignor to the United States of America as represented by the Secretary of Commerce
No Drawing. Original application Jan. 30, 1959, Ser. No. 790,308, now Patent No. 3,066,112, dated Nov. 27, 1962. Divided and this application May 1, 1962, Ser. No. 191,645
2 Claims. (Cl. 260—41)

The present invention is a division of my application Serial No. 790,308, filed January 30, 1959, now U.S. Patent 3,066,112, issued November 27, 1962.

This invention relates to an insoluble, esthetic direct filling material for anterior teeth suitable for use in dental practice and the like and to methods for preparing the same.

The two direct filling materials available to dentists at the present time capable of matching the teeth in appearance are the silicate cements and the methyl methacrylate-based resins. Silicate cements not only lack strength at the edges thereby presenting difficulties in connection with building up cutting edges and corners but they are also soluble in mouth fluids. The methyl methacrylate direct filling resins now in use, on the other hand, have a relatively high shrinkage upon hardening, high coefficient of thermal expansion, low stiffness and low compressive strength.

It is therefore an immediate object of the present invention to provide an improved direct filling material that is less soluble than silicate cements and more dimensionally stable than methyl methacrylate direct filling resins and which is suitable for restoring anterior teeth.

Another object of the invention is to provide an improved filling material and process for preparation thereof which is suitable for dental work wherein said filling material is quick-setting and of improved strength and durability.

It is an additional object of the present invention to provide a filling material having a low shrinkage upon hardening, low coefficient of thermal expansion, high stiffness and high compressive strength.

Other, further, and more specific objects of this invention will become readily aparent to persons skilled in the art from a consideration of the following description, including specific examples.

The dental material of the present invention consists of approximately 70 percent by weight of finely divided fused silica particles that can be used as untreated aggregate or which may optionally be treated with a finishing or keying agent and which particles are bound together by about 30 percent by weight of a crosslinked organic polymer of original composition and chemical structure.

In accordance with one embodiment of the present invention the reaction product of bisphenol A and glycidyl methacrylate, thinned with tetraethyleneglycol dimethacrylate and activated with dimethyl-para-toluidene hardens at room temperature in about 3 minutes when mixed with fused silica powder containing benzoyl peroxide. This tooth-colored solid had a compressive strength of 11,000 pounds per square inch in accordance with the American Dental Association Specification No. 9. When the filler is optionally treated as by the addition of a keying agent such as vinyl silane, the compressive strength was increased to 16,000 p.s.i. The optical opacity of such composition is about $35_{C_{0.70}}$ whereas the solubility and disintegration is 0.04 percent in accordance with the A.D.A. Specification No. 9 test for Dental Silicate Cement. When part of the fused silica was replaced with colorless flint glass (refractive index 1.5795), the X-ray opacity was between that of enamel and dentin without visual differences in color or opacity. When 5 parts benzoyl peroxide per 100 parts resin was used with 74 to 83 percent vinyl silane treated silica, the compressive strength averaged 22,000 p.s.i.

METHODS OF PREPARATION

Materials

The filler.—Clear, colorless, fused silica was selected as the reinforcing filler because of its low coefficient of thermal expansion as well as other desirable properties such as strength and inertness. It is less likely to be abrasive than aluminum oxide or crystalline quartz since its hardness is only about 4.9 on the Mohs scale.

The fused silica particles utilized in this invention can be produced by crushing and reducing to powder, in any conventional manner, the clear, colorless, fused quartz (silica). All impurities or contamination with iron or other foreign materials should be avoided or removed after the powder is formed. The fused silica particles should be fine enough to pass through a number 325 sieve of the U.S. Standard Sieve Series.

The keying agent.—When it is desired to optionally incorporate a keying agent with the filler, the quartz particles produced by the aforementioned step are sifted and treated with a high performance ethylenically unsaturated organosilanol finishing or keying agent suitable to the organic polymer. For example, an aqueous solution of tris (2-methoxy ethoxy) vinyl silane may be catalyzed with sodium hydroxide to give a pH of 9.3 to 9.8, one-half percent of the silane per weight of the fused quartz being used. The slurry is dried at 125° C. and cooled, 1.25 percent by weight of benzoyl peroxide is then dispersed therein. Vinyl trichlorosilane, with or without suitable elastomeric or modifying agents, such as 2,4,6-trimethylolphenyl allyl or poly (vinyl butyral), may also be utilized to enhance the bonding between the silica particles and the organic polymer.

As an example of a keying agent utilizing vinyl trichlorosilane, for example, 3 percent vinyl trichlorosilane is used with 1 percent of the binder, hereinafter to be discussed in detail, and 1 percent of a polyisocyanate compound. These materials are dissolved in methyl methacrylate monomer and mixed with silica, the excess monomer is allowed to evaporate. The product is then heated to 100° C. for one hour after which it is cooled, washed with water and dried at 100° C.

These finished not only render the fused silica particles hydrophobic or water repellent, thereby giving the final material an increased indifference to water, but also increase the strength of the bonding of the resin to the silica particles.

The powder is then ready for admixture with the synthetic resin binder.

The binder.—The new polymerizable resin of this invention which binds the treated silica particles together may be synthesized in several ways.

EXAMPLE 1

As a specific example, two or more moles of glacial methacrylic or acrylic acid may be reacted with one mole of the diglycidyl ether of a bisphenol, such as 4-4'-dihydroxy-diphenyl-2,2-propane, or other similar or analogous epoxide-containing compound.

Other suitable examples of epoxide-containing compounds include substances having the formulas:

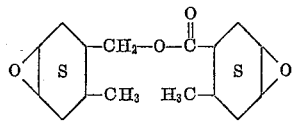

3,4-epoxy-6 methyl cyclohexyl methyl-3,4-epoxy-6- methyl cyclohexane carboxylate, wherein S refers to saturated rings,

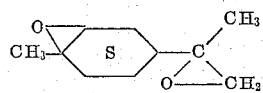

dl-Limonene dioxide,

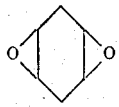

1:4-cyclohexadiene dioxide and

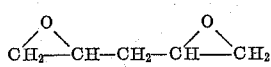

1:4-pentadiene dioxide.

To this reaction is then added about 0.5 to 1.0 percent or more of a tertiary amine, such as dimethyl-para-toluidene, which catalizes the above methacrylic or acrylic acid addition to the indicated epoxide groups and also activates the peroxide catalyst when, at a later time, hardening or solidifying of the material is desired. These ingredients (the methacrylic acid, epoxide and amine) are stirred and held at approximately 60° C. in the presence of a free radical polymerization inhibitor until a standard test for epoxide or acid indicates the reaction is complete. The reaction takes place in accordance with the formula

EXAMPLE 2

As another example of a method for synthesizing the polymerizable intermediate used in connection with the present invention, the condensation of the sodium or other salt of bisphenol A (bis [4-hydroxyphenyl] dimenthyl methane), or other suitable phenolic compound, with an equivalent amount of the reaction product of glycidyl methacrylate or glycidyl acrylate and anhydrous hydrochloric acid may be made in accordance with the following formula:

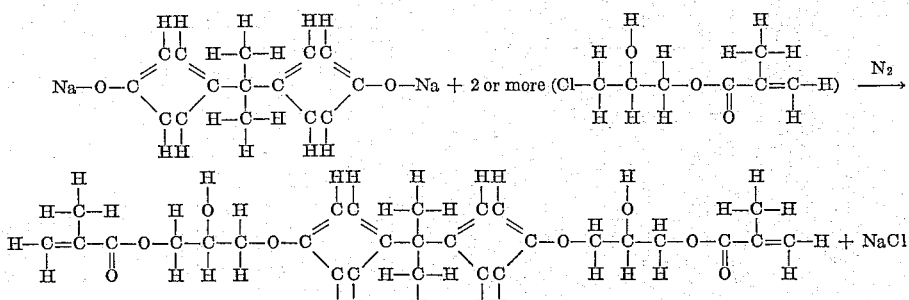

The sodium chloride may then be removed from the reaction product by washing in any conventional manner.

EXAMPLE 3

A preferred method of synthesizing this polymerizable intermediate or monomer is given by the reaction

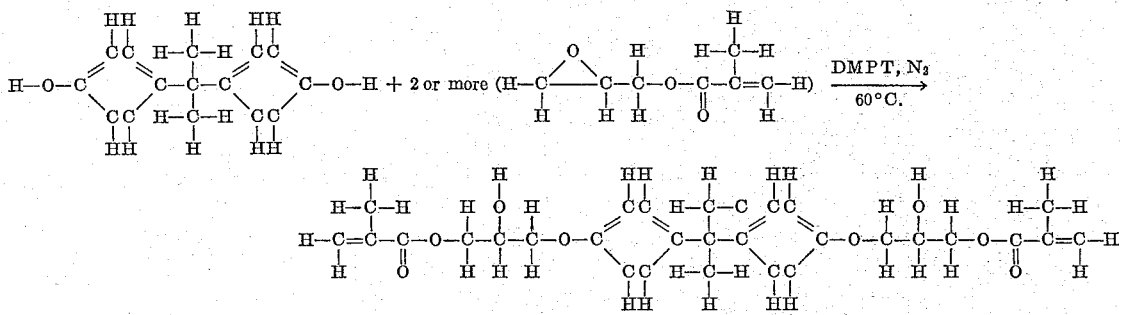

wherein two moles or more of glycidyl methacrylate are combined with one mole of bisphenol A, or other suitable phenolic compound, and 0.5 to 1.0 percent or more of a tertiary amine, such as dimethyl-para-toluidene.

Other suitable phenolic compounds include substances having the formula

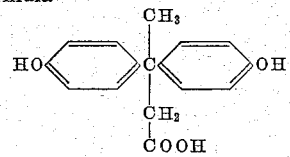

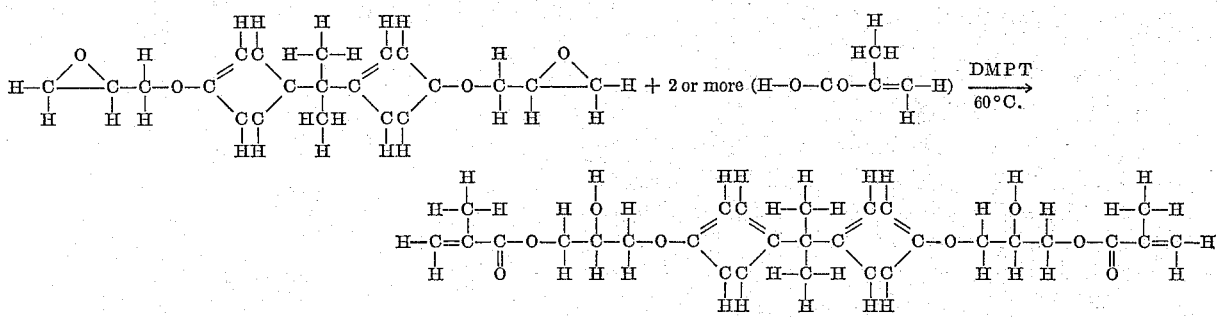

Diphenolic acid or

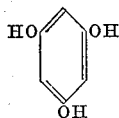

Phloroglucinol.

The tertiary amine will catalyze the addition of the phenolic hydroxyl groups to the epoxide groups and also serve to activate the peroxide catalyst, such as benzoyl peroxide (incorporated in the filler), to polymerize the resin intermediate at room temperature by a free radical mechanism when hardening of the mixture is desired. The glycidyl methacrylate, bisphenol and alkaline catalyst are held in a nitrogen atmosphere at approximately 60 C. with continual stirring until the reaction is complete in accordance with the following new test.

In said test a few drops of the reaction product are mixed with enough fused silica powder (or other reinforcing filler), which contains approximately 2 percent benzoyl peroxide, to produce a stiff paste. This composition is then placed between two films of polyethylene, or is in some other way protected from atmospheric oxygen, and thereafter heated to 90° C. A negative test is indicated by the sample failing to harden whereas in a positive test the sample hardens within 10 minutes. The phenolic hydroxyl groups inhibit free radical polymerization until the phenol groups are used up (etherified) by the addition reaction with the oxirane (epoxy) groups.

When a positive test indicates the reaction, as described in any of the aforementioned examples, is complete, approximately 0.006 percent hydroquinone is added to prevent premature polymerization of the methacrylate or acrylate groups. The hydroquinone is dissolved in enough concentrated hydrochloric acid to react with any excess or remaining epoxide groups.

The reaction product is then reduced in viscosity to a medium syrup by the addition of methyl methacrylate, ethylene or tetraethylene glycol dimethacrylate or other suitable reactive diluents.

The syrup or resin intermediate is then ready for use with the treated fused silica powder containing benzoyl peroxide or other suitable catalyst.

A period of 3 to 10 minutes expires between the start of the mix and the time the material hardens. However, this time may be reduced by adding more activator (dimethyl-para-toluidene or paratoluene sulfinic acid). On the other hand, hardening time may be lengthened by "washing out" some of the dimethyl-para-toluidene or other tertiary amine catalyst with a dilute aqueous hydrochloric acid solution.

To use the material, the treated silica powder, containing a suitable catalyst, such as about 1.25 percent by weight benzoyl peroxide, is mixed with the sirupy liquid organic material (heretofore described) which contains a suitable activator, such as dimethyl-para-toluidene or para-toluene sulfinic acid, and the mixed aggregate is promptly placed in the cavity to be filled, wherein it hardens at mouth temperature within 10 minutes by polymreization of the organic material.

*Properties of the materials*

*Setting time.*—The setting time is defined as the number of minutes elapsed from the starting of the mix to the time when the point of a penetrating instrument, such as the point of a Gilmore needle, fails to make a perceptible indentation on the surface of the specimen. Setting times were determined either at room temperature or at 37° C. When 70–80 percent of the powder was mixed with the liquid resin it hardened within ten minutes at 37° C.

*Compressive strength.*—The compressive strength was tested according to the American Dental Association Specification No. 9 for Dental Silicate Cement. The compressive strength was found to be higher using the vinyl silane treated powder than when untreated powder was used, especially if the specimens were stored in water for 7 days.

With the vinyl silane treated silica, the particle size influenced the compressive strength. Specimens made with "coarse" particles (those passing U.S. Standard Sieve No. 100 but retained on No. 325) gave 15,000 pounds per square inch, while specimens made with "fine" particles (those passing U.S. Standard Sieve No. 325) gave 23,000 p.s.i. Specimens prepared from a mixture of the particles showed an intermediate strength of 19,000 p.s.i.

*Solubility and disintegration.*—Solubility and disintegration were tested in accordance with the aforementioned A.D.A. Specification No. 9 for Dental Silicate Cement except that the weighing bottles were weighed after drying at 99° C. and 110° C. to detect organic leach products that might be driven off at the usual 149° C. The solubility was 0.00 to 0.08 percent by weight.

*Coefficient of thermal expansion.*—The coefficient of thermal expansion was measured on three specimens containing 70 percent vinyl silane treated fused quartz. The average was $24 \times 10^{-6}$ (p.p.m.) per degree C. between 30° C. and 40° C.

*Hardening shrinkages.*—Polymerization or hardening shrinkage tests were made using the dilatometer method developed by Smith and Schoonover. The volumetric shrinkage was about 2 percent (measurements were taken on four specimens wherein the time varied from the first measurement, at about 3 minutes to 60 minutes from start of mix) at 37° C. when the mix contained 66 percent vinyl silane treated fused silica by weight. This value of 2 percent is tentative until further tests over longer time intervals are made.

*Color stability.*—Color stability was tested by 24-hour exposure of half of each set of specimens to the ultraviolet source described in American Dental Association Specification No. 12 for Denture Base Resin, and by comparison with the other half of the specimens that had been shielded with aluminum foil tape.

The color change was less than that produced in comparable mixes made with a self-curing methyl methacrylate syrup mixed with the treated silica. In both cases the color change was believed to be due to the dimethyl p-toluidene activator.

The use of one percent of a commercial ultraviolet absorber per weight of the synthetic resin prevented color change produced by the ultraviolet lamp without affecting the hardening time.

*Opacity.*—The visual opacity when tested according to the A.D.A. Specification No. 9 for Dental Silicate Cement was slightly above 35 percent ($C_{0.70}$).

The X-ray opacity could be raised to approximate tooth structure by using 20–30 percent of clear, colorless, flint glass containing about 35.5 percent of lead oxide. This would not perceptibly affect the color or visual opacity.

Any reinforcing filler, pigment or other inclusion, in a resin-bonded material, should be treated with a suitable keying agent or finish that is capable of forming stable chemical bonds to both the resin and the included material. In the case of vinyl silane, the hydrolyzed silicone can combine by condensation with the surface of the fused silica particles, exposing vinyl groups which can copolymerize with the resin when it hardens. Illustrating this, the silica-resin material was allowed to harden on the surfaces of glass slides that were vinyl silane treated and controls that were untreated. They were then immersed in water. The patches of material came loose from the untreated slides within two days but adhered to the treated glass surfaces for a year.

Glass surfaces and fused silica powder that have been treated with vinyl silane are water repellent; when untreated, if clean, they are very hydrophilic.

If the surfaces of pigment or filler particles have, by their nature, greater affinity for water than they have for the organic resin binder, they will be sources of stress concentration and mechanical weakness when serving in the moist oral environment.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A dental filling material comprising about 70% to about 83% by weight of a filler and about 30% to about 17% by weight of a hardenable resin; said filler comprising a mixture of fused silica and a peroxide catalyst; said resin comprising the condensation product of a salt of a polyhydric phenol with the reaction product of hydrochloric acid and at least one member of the class consisting of glycidyl methacrylate and glycidyl acrylate, and a tertiary amine for producing free radicals upon reacting with said peroxide catalyst in said filler.

2. A dental filling material as set forth in claim 1, wherein said fused silica is treated with a member of the class consisting of tris(2-methoxy ethoxy) vinyl silane and vinyl trichlorosilane.

References Cited by the Examiner
UNITED STATES PATENTS

| | | | |
|---|---|---|---|
| 2,824,851 | 2/58 | Hall | 260—45.5 |
| 2,859,198 | 11/58 | Sears et al. | 260—37 |
| 3,066,112 | 11/62 | Bowen | 260—41 |

MORRIS LIEBMAN, *Primary Examiner.*

ALEXANDER H. BRODMERKEL, *Examiner.*